United States Patent [19]

Price et al.

[11] Patent Number: 4,532,639
[45] Date of Patent: Jul. 30, 1985

[54] CFAR RECEIVER APPARATUS FOR DETECTING A SIGNAL IN NOISE

[75] Inventors: Robert Price, Lexington; Richard R. Kurth, Sudbury, both of Mass.

[73] Assignee: Sperry Corporation, New York, N.Y.

[21] Appl. No.: 533,480

[22] Filed: Sep. 19, 1983

[51] Int. Cl.[3] .............................................. H04L 1/00
[52] U.S. Cl. .................................. 375/96; 343/5 CF;
343/7 A; 375/102; 375/103
[58] Field of Search .................. 375/96, 99, 102, 103;
455/296, 303, 308; 343/5 CF, 7 A, 378;
364/728, 819, 604; 367/39, 40, 100; 329/145

[56] References Cited
U.S. PATENT DOCUMENTS

| | | | |
|---|---|---|---|
| 3,656,064 | 4/1972 | Giles et al. | 329/145 |
| 4,328,591 | 5/1982 | Baghdady | 455/303 |
| 4,401,987 | 8/1983 | Cyr | 343/5 CF |

Primary Examiner—Marc E. Bookbinder
Attorney, Agent, or Firm—Howard P. Terry; Albert B. Cooper

[57] ABSTRACT

A CFAR estimator-correlator comprises an estimating filter responsive to the signal-plus-noise input process for providing an estimate of the signal waveform. The estimate and the signal-plus-noise process are applied to a correlator. An amplitude limiter interposed between the signal-plus-noise input and the correlator and a bandpass amplitude limiter interposed between the estimating filter and the correlator impart a CFAR characteristic to the apparatus. An interferometer is configured by utilizing separate sensors to provide a signal-plus-noise input process and a further signal-plus-noise input process to the amplitude limiter coupled to the correlator and to the estimating filter, respectively.

14 Claims, 2 Drawing Figures

CFAR RECEIVER APPARATUS FOR DETECTING A SIGNAL IN NOISE

BACKGROUND OF THE INVENTION

1. Field of the Invention

The invention pertains to signal in noise detection particularly with respect to signal detection apparatus having a CFAR detection characteristic.

2. Description of the Prior Art

The estimator-correlator signal receiver device for detecting a noise like signal in a noise background is known in the prior art. Specifically, such estimator-correlators provide optimal detection of the presence of a gaussian random signal against a gaussian noise background. Such an estimator-correlator arrangement is disclosed in FIG. 7.11-4 of the textbook "Radar Detection" by J. V. DiFranco and W. L. Rubin, Prentice-Hall, Inc., Englewood Cliffs, N. J., 1968. Further references to the estimator-correlator may be had in the paper "Optimum Detection of Random Signals in Noise, with Application to Scatter-Multipath Communication, I" by Robert Price in the IRE Transactions on Information Theory, December 1956, page 125, in the paper "A Communication Technique for Multipath Channels" by R. Price and P. E. Green in the Proceedings of the IRE, Vol. 46, No. 3, March, 1958, page 555, and in U.S. Pat. No. 2,982,853, issued on May 2, 1961 to R. Price, et al entitled "Anti-Multipath Receiving System". The false alarm rate for such devices is typically a function of the background noise level, as well as of the setting of the detection output threshold. For reasons well appreciated in the art, it would be desirable to impart a constant false alarm rate (CFAR) characteristic to the circuit.

SUMMARY OF THE INVENTION

Accordingly, the present invention imparts a CFAR characteristic to the estimator-correlator thereby rendering the detection performance thereof independent of absolute background noise level. That is, the false alarm probability of exceeding the detection threshold is invariant to the noise intensity in the presence of noise alone. Thus, the present invention is embodied by CFAR receiver apparatus for detecting a signal in noise comprising a linear estimating filter responsive to the signal-plus-noise process (this input including the no-signal case) for providing an estimate of the signal, together with a signal correlator. A first signal branch couples the signal-plus-noise process to the correlator. The apparatus further includes a second signal branch coupling the output of the estimating filter to the correlator. An amplitude limiter in at least one of the branches imparts a CFAR characteristic to the apparatus, where the term CFAR denotes any technique tending to stabilize the false alarm probability of a detection apparatus against variations of noise intensity. In the preferred embodiment of the invention, hard limiters are included in each branch with a bandpass zonal filter following the limiter in the second branch.

DESCRIPTION OF THE PREFERRED EMBODIMENTS

Figure 1:
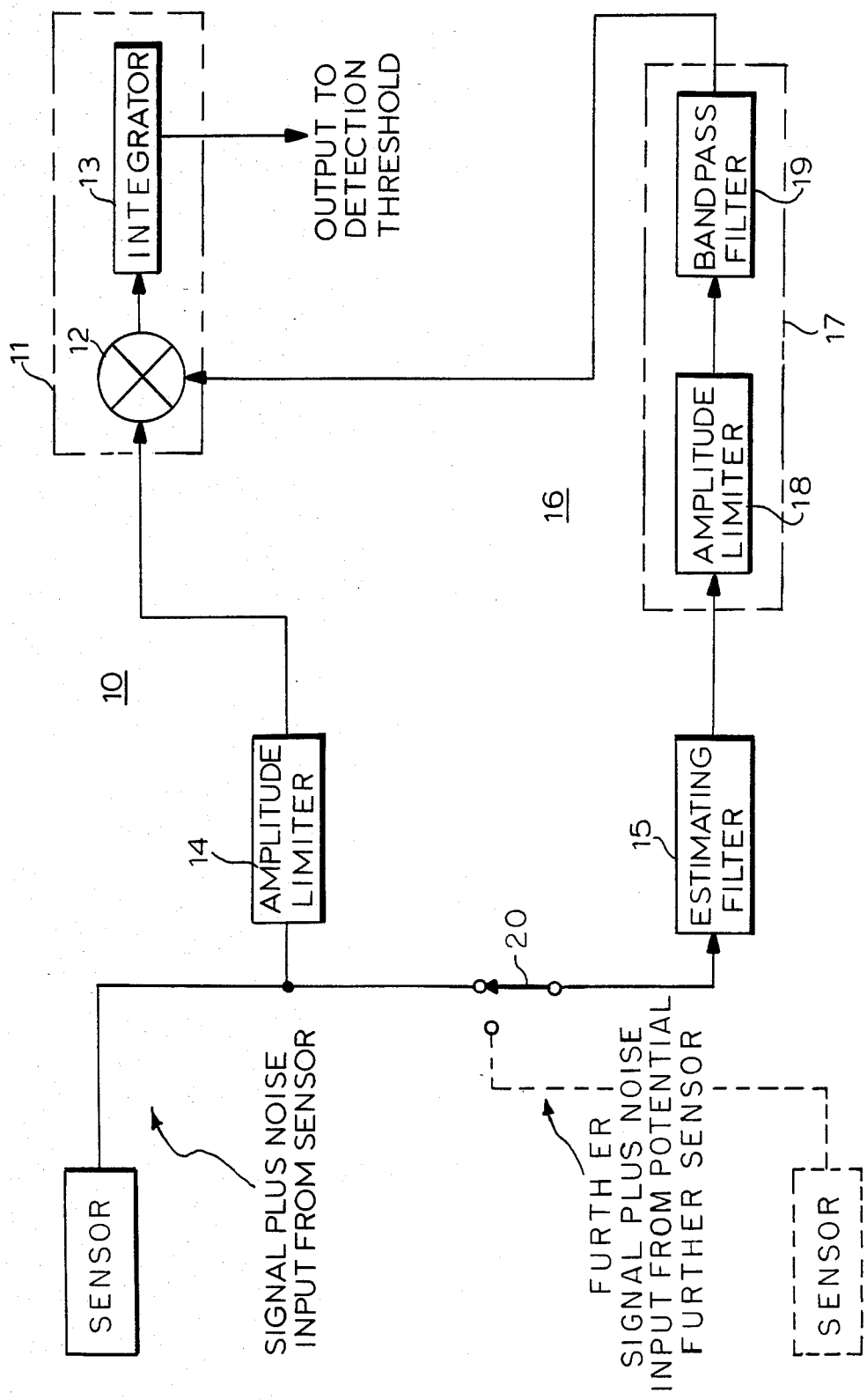
FIG. 1 is a schematic block diagram of a CFAR estimator-correlator constructed in accordance with the present invention.

FIG. 1 illustrates a CFAR estimator-correlator embodied in accordance with the present invention. The invention may be utilized to detect narrow-band weak gaussian random signals against a wider-spectrum gaussian noise background. Such signals in noise may occur, for example, in a continuous wave (CW) radar system wherein a sinusoidal CW signal is transmitted to illuminate a sector in space with detected CW reflections from an extended target therein providing a target detection capability. Multipath target returns to the CW signal may have a gaussian random distribution and are of narrow fractional bandwith, i.e., less than one octave and are embedded in random background noise. Such noise like signals in background noise may also be encountered in sonar surveillance receivers. The invention may be utilized in active or passive signal-in-noise detection systems, and often can be effective whether or not gaussian statistical conditions are observed and even if the signal is highly non-random. Even if the signal is fully known, the background noise is still unknown, rendering the invention usable in such a situs.

The received signal-plus-noise process is applied via a first signal branch 10 as a first input to a correlator 11. In a well-known manner, the correlator 11 may be comprised of a multiplier 12 and an integrator 13, where the integration is performed over as short or long a duration as may be desired. Interposed in the first signal branch 10 is an amplitude limiter 14 which is preferred embodiments of the invention comprises a hard limiter. The signal-plus-noise process, hard limited by the amplitude limiter 14, is applied as a first input to the multiplier 12. The output of a second signal branch 16 is applied as the second input to the multiplier in a contexture to be further described. The output of the multiplier 12 is coupled as an input to the integrator 13. The output of the integrator 13 is applied to conventional detection threshold circuitry (not shown) where the threshold is set in accordance with the desired false-alarm rate.

In the above description, the correlator 11 is illustrated comprised of a multiplier and integrator. Alternatively, as referred to in footnote 3 on page 556 of the above-referenced Proceedings of the IRE paper, the correlator may be constructed on a difference-frequency principle. Here, at least one of the two branches 10 and 16 is frequency translated by heterodyning to create a constant and known frequency difference between respective signal spectral components in the two branches. The multiplying element of the correlator then exists as before, but the integrator is replaced by a filter, normally narrow band and tuned to the known difference frequency, the output of this filter usually being envelope-rectified to provide the final output into the detection threshold circuitry. This difference-frequency correlation method can be advantageous in alleviating problems of accurate multiplier fabrication.

The signal-plus-noise process is also applied, via a switch 20, to a linear estimating filter 15, that is often referred to as a Wiener-type filter and is constructed in a well-known manner to provide a substance, a minimum variance or least-mean-square estimate of the signal. The filter 15 preferably provides a running estimate of the signal component present simultaneously at the input of the multiplier 12 from the branch 10, where the estimation may be made in accordance with either the presence or the absence of the limiter 14. Either of these two estimation options may, in fact, be employed in the CFAR estimator-correlator whether or not the limiter 14 is actually present in the invention. The passband of the filter 15 is generally approximately matched to the expected power spectrum of the expected received signal.

Since, in preferred embodiments of the invention, the signal to be detected possesses a narrow bandwidth, the filter 15 is generally a narrow band filter. For example, in a CW illuminating radar environment, the estimating filter 15 may be a bandpass filter designed to pass the frequency band of the CW returns. Should the power spectrum of these returns be of unknown nominal center frequency, for example, because of unknown Doppler shift, then one might construct a multiplicity of CFAR estimator-correlators each having an estimating filter matched to a possible power spectrum for searching out the presence of a signal thereby. A more powerful detection procedure than that of simple thresholding, for example, one similar to dynamic programming, might be employed at the outputs of such a bank of CFAR estimator-correlators. For this or other purposes, the correlation integration might be made quite short or even of zero duration.

The present invention may be utilized for statistically non-stationary as well as stationary processes. For non-stationary processes, the estimating filter 15 is embodied by utilizing a time varying linear filter designed in a well-known manner in accordance with the time-variant correlation function of the expected signal. The above-referenced IRE Transactions paper describes such a species of time-varying linear filter. For the stationary processes, the filter 15 is embodied as described above as a filter approximately matched to the power spectrum of the expected received signal.

The output of the estimating filter 15 is applied via a second signal branch 16 to the second input of the multiplier 12. Interposed in the signal branch 16 is a bandpass limiter 17 which comprises an amplitude limiter 18 followed by a bandpass zonal filter 19. In the preferred embodiment of the invention, the amplitude limiter 18 is preferably a hard limiter, and the zonal filter 19 is designed to pass the fundamental frequency zone of the output signal from the amplitude limiter 18 without introducing excessive signal delay.

Thus it is appreciated that the hard limited and bandpass filtered estimate of the signal provided by the branch 16 is correlated with the hard limited signal-plus-noise process on the branch 10. Because of the amplitude limiting action of the limiters 14 and 18, the probability of target detection is dependent on the input signal-to-noise ratio rather than on the absolute values of both the signal level and the noise level. Similarly, the false alarm rate is dependent on stochastic spectral properties of the noise other than its intensity, rather than on all of these properties including intensity. Thus, the setting of the threshold of the threshold device to which the output of the integrator 13 is applied determines a false alarm rate which is independant of the noise level. The amplitude limiters 14 and 18, which in the preferred embodiment of the invention are hard limiters, impart the CFAR detection characteristic to the estimator-correlator device by removing all amplitude information from the noise when it alone is present.

The non-linear limiting action of the amplitude limiter 14 introduces spurious spectral cross-products into the signal-plus-noise process on the branch 10. These spurious cross-products are the result of intermodulation and harmonic distortions introduced by the non-linearity. Similar spurious cross-products are introduced by the amplitude limiter 18; however, the narrow band filtering effected by the estimating filter 15 significantly reduces the intermodulation distortion that would have been introduced by the non-linear operation of the limiter 18 and the bandpass filter 19 reduces a substantial amount of the harmonic distortion actually introduced by the limiter 18. Thus, it is appreciated that the bandpass limiter 17 prevents many spurious cross-products from entering the multiplier 12 and being integrated against counterpart spurious cross-products at the output of the limiter 14, thereby enhancing the signal correlation efficacy and providing an increase in signal detectability.

It is appreciated that generally the amplitude limiter 14 will not be a bandpass limiter because the input noise is generally a wideband signal of more than an octave in bandwidth. Thus, zonal filtering in the branch 10 would not be utilized when the input noise is not bandwidth limited. Alternatively, bandpass filters which are broad relative to the bandwidth of the estimation filter 15 may be placed either before or after or on both sides of the limiter 14. The passbands of such filters would encompass the signal spectrum and be no more than about one octave in width. A bandpass filter immediately ahead of the limiter 14 could alternatively precede the junction which provides signal-plus-noise to both the limiter 14 and the estimating filter 15. In the branch 16, generally the bandwidth of the bandpass filter 19 (e.g. one octave) will be fairly broad with respect to the bandwidth of the narrow band estimating filter 15 and so will not cause excessive signal delay.

Although the limiters 14 and 18 should be hard limiters to attain strict CFAR performance, other amplitude limiter arrangements may also be utilized in practicing the invention. For example, it may be desirable to use a soft clipper type limiter in either or both of the branches 10 and 16. CFAR performance may also be compromised by utilizing a limiter in only one of the branches 10 and 16 to obtain enhanced signal detectability by partial avoidance of spurious cross-products.

Since filtering precedes the amplitude limiter 18, the estimator-correlator structure of the present invention will considerably reduce the intermodulation caused false alarms when multiple narrow band signals are present in the input from the sensor. If it is desirable to detect the combined presence of more than one narrow band signal, the branch 16 of the CFAR estimator-correlator may be constructed to contain an estimating filter such as the filter 15 and a bandpass limiter such as the bandpass limiter 17 for each signal signal. These multiple paths are connected in parallel and are driven from the common signal-plus-noise input with the outputs of the paths being summed into the multiplier 12, possibly with the path outputs being gain-differentially weighted before summation.

Pragmatically, the overall performance of the device illustrated in FIG. 1 may be enhanced by adjusting the impulse response of the linear estimating filter 15. Similarly, the integrator 13 may have a diminishing memory which may decay, for example, along an exponential curve. The multiplier 12 may also include some amplitude limiting action. These latitudes may be utilized in obtaining a pragmatically optimum overall performance.

It is appreciated that although the preferred embodiment of the invention is explained in terms of the correlator 11 comprising a multiplier 12 and an integrator 13, the block 11 may comprise the multiplier 12 alone without the integrator. The multiplication process then performed within the block 11 is considered to be correlation within the context of the invention.

Figure 2:
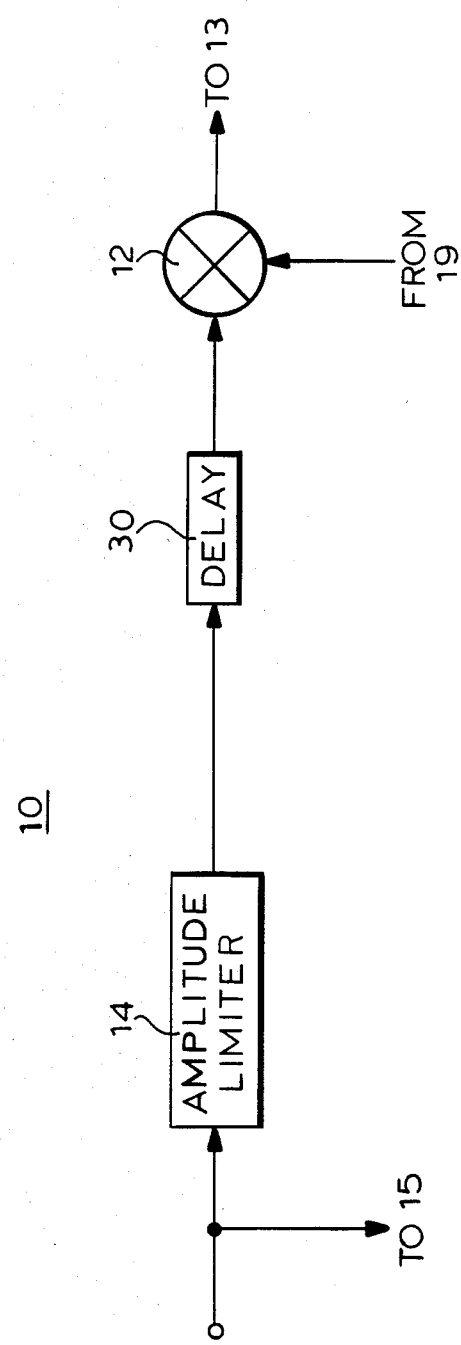
FIG. 2 is a schematic block diagram of an alternative embodiment of the CFAR estimator-correlator of FIG. 1.

FIG. 2 illustrate another preferred embodiment of the invention incorporating all of the aspects previously described, wherein a pure time delay 30 may be introduced into the signal branch 10 by various means such as the use of a delay line or storage device. The estimating filter 15 is then still designed to provide a running minimum-variance estimate of the signal component present simultaneously at the input of the multiplier 12 from the branch 10. Since an estimation time-lag is thereby permitted, the quality of the estimate can be improved as is well-known in the art. In particular, the optimum estimating filter may then be made narrower in bandwidth with, it is believed, consequently greater suppression of spurious cross-products in the ouput of the amplitude limiter 18 and thus correspondingly increased signal detectability. The above-referenced IRE Transactions paper contemplates the use of a non-causal linear estimating filter, coresponding to the introduction of time lag or delay into the branches 10 and 16 of the present invention for rendering it physically realizable.

For ease of explanation in all of the foregoing description, the switch 20 has been considered to be connnected, as illustrated, to the same signal-plus-noise sensor input as is provided to the first signal branch 10. However, it will be readily appreciated that should there exist a further sensor which potentially could provide a further signal-plus-noise input, the present CFAR estimator-correlator invention could well be embodied in two-channel-input, or interferometer form. Such interferometry is widely understood to be useful, for example, when searching out arrival angles of signals, in which application appropriate time delays or phase shifts may be introduced at the respective signal-plus-noise sensor inputs in accordance with prior art.

Satisfactory interferometer operation can result when switch 20 is connected to the further sensor in place of the first sensor, when the proper design considerations for the entire CFAR estimator-correlator structure of the foregoing description are adhered to, and preferably, when the signal from the further sensor correlates with that from the first sensor while the noise output from the further sensor substantially differs from that of the first sensor.

It will moreover be appreciated that interferometer operation is recognized to be the most elementary form of sensor-array operation, and therefore, that CFAR estimator-correlator reception can be extended straightforwardly to sensor-array surveillance, wherein such arrays consist of more than two sensors. This can typically be accomplished by respectively providing for each additional appropriately delayed or phase-shifted sensor input a further separate branch like the second branch 16 in FIG. 1, supplying each further branch output respectively to a separate correlator whose other input is shared in common from the first branch 10 of FIG. 1, and then summing together all the integrated correlator outputs possibly in combination with various amplification gains or weightings. Other such rerrangements and elaborations of the present basis CFAR estimator-correlator invention will be obvious to those skilled in the art, as for example its ready adaptability to sparse, thinned or irregular, or incompletely filled sensor arrays. Also, the various sensor inputs to the invention may, in general usage, be prefiltered alike or differently and the sensors themselves may comprise multiple-element arrays. Additionally, it may sometimes be desirable to replace the amplitude limiter 14 by a bandpass limiter like that shown in the block 17 of FIG. 1.

While the invention has been described in its preferred embodiment, it is to be understood that the words which have been used are words of description rather than limitation and that changes may be madew within the purview of the appended claims without departing from the true scope and spirit of the invention in its broader aspects.

We claim:

1. CFAR receiver apparatus for detecting a signal in noise comprising:
   sensor means for providing said signal in noise,
   linear filter means coupled to said sensor means for providing an estimate of said signal,
   correlator means,
   a first signal branch coupling said sensor means to said correlator means,
   a second signal branch coupling said linear filter means to said correlator means, and
   amplitude limiting means in at least one of said first and second branches for effecting CFAR detection performance of said apparatus.

2. The apparatus of claim 1, in which said sensor means comprises a sensor for providing the sum of said signal plus said noise to said first signal branch and to said linear filter means.

3. The apparatus of claim 1, in which said sensor means comprises a sensor for providing said signal in noise to said first signal branch, and a further sensor for providing a further signal in noise to said linear filter means.

4. The apparatus of claim 1, in which said amplitude limiting means comprises first and second amplitude limiting means in said first and second signal branches, respectively.

5. The apparatus of claim 4, in which one of said first and second amplitude limiting means comprises hard limiting means.

6. The apparatus of claim 4, in which each said first and second amplitude limiting means comprises hard limiting means.

7. The apparatus of claim 4, further including a bandpass filter coupled between at least one of said amplitude limiting means and said correlator means.

8. The apparatus of claim 1, in which said correlator means comprises:
   multiplier means having inputs coupled to said first and second signal branches, respectively, and
   integrator means coupled to the output of said multiplier means for providing the ouptut of said CFAR receiver apparatus.

9. The apparatus of claim 7, in which said correlator means comprises:
   multiplier means with respective inputs coupled to the output of said first limiter means and the output of said bandpass filter means, and
   integrator means coupled to the output of said multiplier means for providing the output of said CFAR receiver apparatus.

10. The apparatus of claim 1, in which said limear filter means comprises:

at least mean square estimating filter for providing a minimum variance estimate of said signal.

11. The apparatus of claim 1, in which said CFAR receiver appartatus comprises apparatus for detecting a narrow band signal in noise.

12. The apparatus of claim 1, in which said CFAR receiver apparatus comprises apparatus for detecting a narrow band random signal in random noise.

13. The apparatus of claim 1, including delay means in said first signal branch for introducing a time delay therein and wherein said linear filter means provides a minimum variance estimate of said signal corresponding to the said delay.

14. The apparatus of claim 4, including delay means coupled between said first amplitude limiting means and said correlator means.

* * * * *